United States Patent [19]
Gilli et al.

[11] Patent Number: 5,272,311
[45] Date of Patent: Dec. 21, 1993

[54] PROCESS AND APPARATUS FOR THE CUTTING TO SHAPE OF SHEETS OF PLASTIC MATERIAL

[75] Inventors: Luigi Gilli, Luserna San Giovanni; Vittore De Leonibus, Vasto, both of Italy

[73] Assignee: Società Italiana Vetro - SIV - S.p.A., San Salvo, Italy

[21] Appl. No.: 797,075

[22] Filed: Nov. 25, 1991

[30] Foreign Application Priority Data

Nov. 26, 1990 [IT] Italy .................. 83528 A/90

[51] Int. Cl.$^5$ ............................................. B23K 26/00
[52] U.S. Cl. ........................... 219/121.67; 219/121.72
[58] Field of Search ............ 219/121.67, 121.72, 219/121.82, 121.18

[56] References Cited

U.S. PATENT DOCUMENTS

| | | | |
|---|---|---|---|
| 4,672,172 | 6/1987 | Pearl | 219/121.67 |
| 4,740,668 | 4/1988 | Perez | 219/121.67 X |
| 5,098,005 | 3/1992 | Jäck | 219/121.82 X |
| 5,132,510 | 7/1992 | Klingel et al. | 219/121.82 |

*Primary Examiner*—C. L. Albritton
*Attorney, Agent, or Firm*—Wenderoth, Lind & Ponack

[57] ABSTRACT

A process and apparatus for cutting sheets of plastic material takes place upon a mobile support, such as a pallet. The pallets is centered for the cutting of the material and for the removal thereof in an assembly zone integral with a production line in which the materials of laminate glass are assembled. The pallet passes along a closed circuitous route, preferably in the presence of a plurality of similar pallets.

38 Claims, 5 Drawing Sheets

PROCESS AND APPARATUS FOR THE CUTTING TO SHAPE OF SHEETS OF PLASTIC MATERIAL

FIELD OF THE INVENTION

The present invention relates to a process for cutting to shape of sheets of plastic material.

A further object of the present invention is an apparatus using said process.

More in particular, object of the invention is a process and an apparatus suitable for the automatic cutting to shape of sheets of plastic material as they arrive from lines of supply, and for presenting the material thus cut to shape in the area where it is to be finally used.

The present invention finds particular application in plants for the production of laminated glass for vehicles or other means of transport, as well as for the production of safety glass in general.

DESCRIPTION OF THE PRIOR ART

From the state of the art are known problems regarding the cutting to shape of plastic materials, for instance of the kind known as PVB (polyvinylbutiral), used in the manufacture of laminated glass, to which specific reference will be made in the course of the description.

This glass, as it is known, is made up of two or more sheets of glass glued to each other, said glueing being performed by interposing between the sheets a film of plastic material, which will be indicated in the following as PVB.

PVB is a transparent material resistant to tensile stress and it renders the glass shatter-proof as, in the case of breakage, the splinters of glass remain attached to the adhesive film.

Multi-layer glass is substantially elastic and is used as a protection against implosion, for example in vehicles.

From the state of the art are known systems suitable for the automatic manufacture of laminated glass.

These known systems cooperate with suitable supply magazines from which the "male" and "female" sheets of glass are taken one at a time, as well as the shaped PVB film to be placed between the sheets of glass.

A system of this kind is described for example in IT-A83555.

The sheets of PVB film are ready-cut to measure at special work stations separate from the glass assembly line, and are then transferred into the supply magazines.

Applicant is not aware of cutting systems capable of automatically providing for the desired cutting to shape of the sheets of PVB, as well as their transfer, also in an automatic manner, onto the glass assembly line.

The invention has the aim of providing a process and an apparatus of the type indicated above, and therefore suitable to be perfectly integrated with in-line apparatuses for the assembly of glass laminates.

DESCRIPTION OF THE INVENTION

According to the invention, the cutting to shape of the material, as well as the handling of the material thus cut, takes place by means of a moving support on which said material is positioned.

The moving support can with advantage be, for example, a pallet-type element, and this term will be used to indicate it in the following description.

The pallet travels in cycle along the working line, passing from a first phase for loading ad cutting of the PVB to a final phase in which the cut PVB is delivered to the apparatus for assembly of the glass laminates.

Accurate centering of the pallet in the areas in which the PVB is cut and picked up for coupling with the sheets of glass, gives the whole process the desired and necessary precision.

The film of cut PVB also retains the desired centering conditions on the pallet during the movements of the pallet itself, so that it is in a predetermined and certain position in the area of cooperation with the apparatus for assembly of the glass laminates.

The invention, in its essential lines, provides for transit of the pallet in a cutting area formed by two cutting stations, operating alternately one to the other.

A first station is equipped to perform the cutting of curved or, as it is known, "stretched" material and, with this object, it cooperates with a group for feeding and adjustment of the stretched PVB wound on conical rolls.

A second station is equipped for the cutting of so-called "flat" material and, with this object, it cooperates with apparatus for the feeding and adjustment of flat PVB wound on cylindrical rolls, and also with an apparatus known as a slacking apparatus, which has the object of unwinding the material, causing a slack in the latter.

Cutting of the sheet of PVB takes place by means of a laser beam, preferably in a polar axes apparatus, that is to say with means that move according to polar coordinates with reference to the fixed material to be cut.

The cutting stations are suitably equipped to cope with various sizes of shaped PVB, both straight and curved, and can be provided with means for the suction of any fumes that may be released during the cutting operations.

Downstream of the cutting stations is preferably provided a pallet rotation station, the function of which is to perform a 180 angular rotation of the pallet.

This is required in the case of straight shape, for example those with a trapezoidal shape, which are cut in sequence and next to each other on the film of PVB, but each one placed specularly with respect to the next.

The shaped sheets preferably face in the same direction when arriving in the area of cooperation with the glass assembly apparatus situated downstream.

From said pallet rotation station, the pallet can pass on to one or more waiting and transit stations situated upstream of the PVB take-up station, which is in its turn suitably situated in correspondence with the glass and PVB assembly area.

In said PVB take-up station, the pallet with the material to be taken up undergoes with advantage a centering operation, and is then taken up.

The empty pallet is conveniently re-cycled and returned once again to the PVB cutting area.

These and other aspects particular to the invention will be better understood from the following description.

BRIEF DESCRIPTION OF THE DRAWINGS

With reference to the enclosed drawings, provided as a non-limiting example:

FIGS. 6a to to 6e illustrate a preferred embodiment of a pallet used in the embodiment of FIG. 1.

DESCRIPTION OF THE PREFERRED EMBODIMENTS

Figure 1:
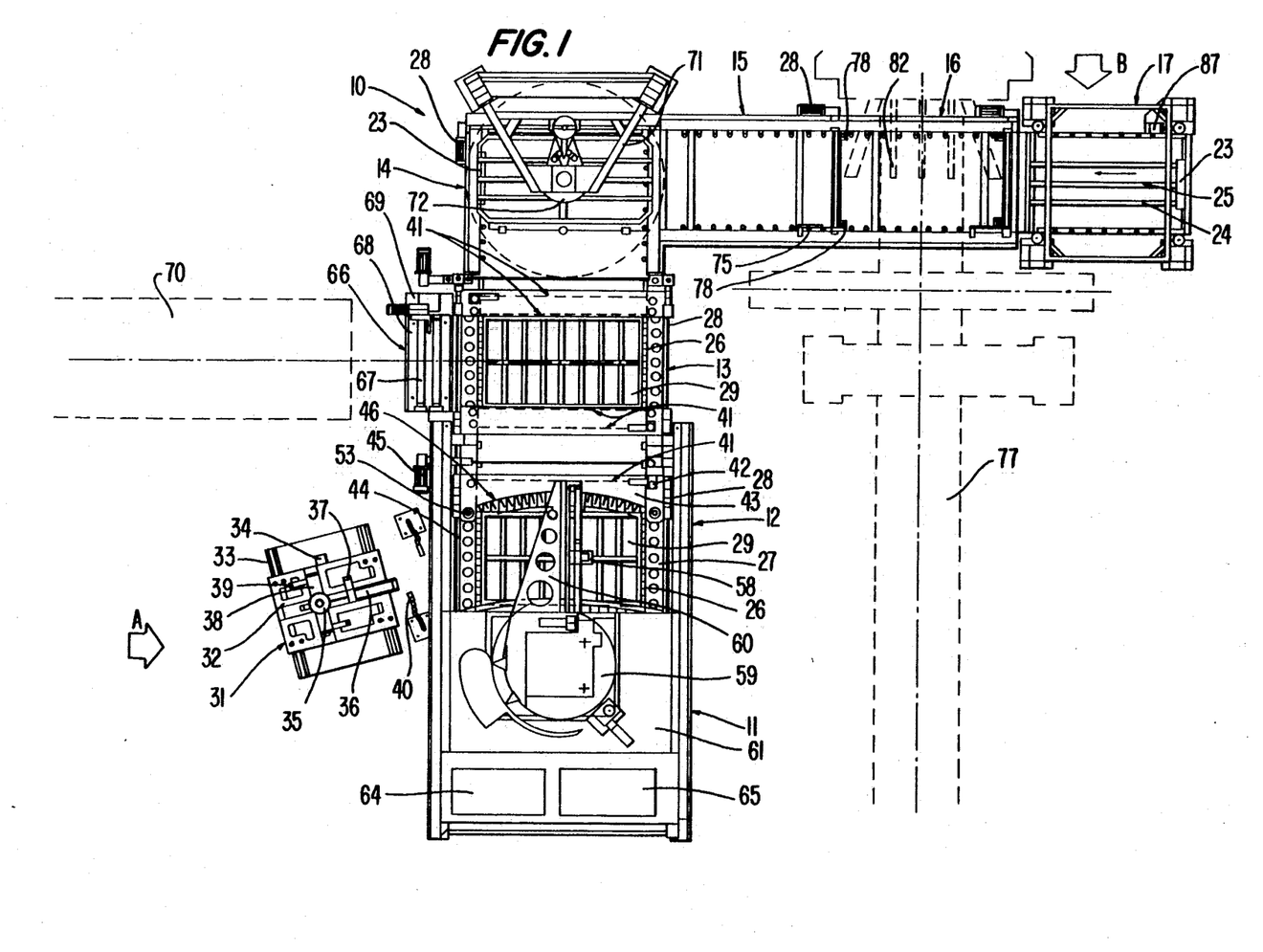
FIG. 1 illustrates a plan view of a preferred embodiment of the invention.
Figure 2:
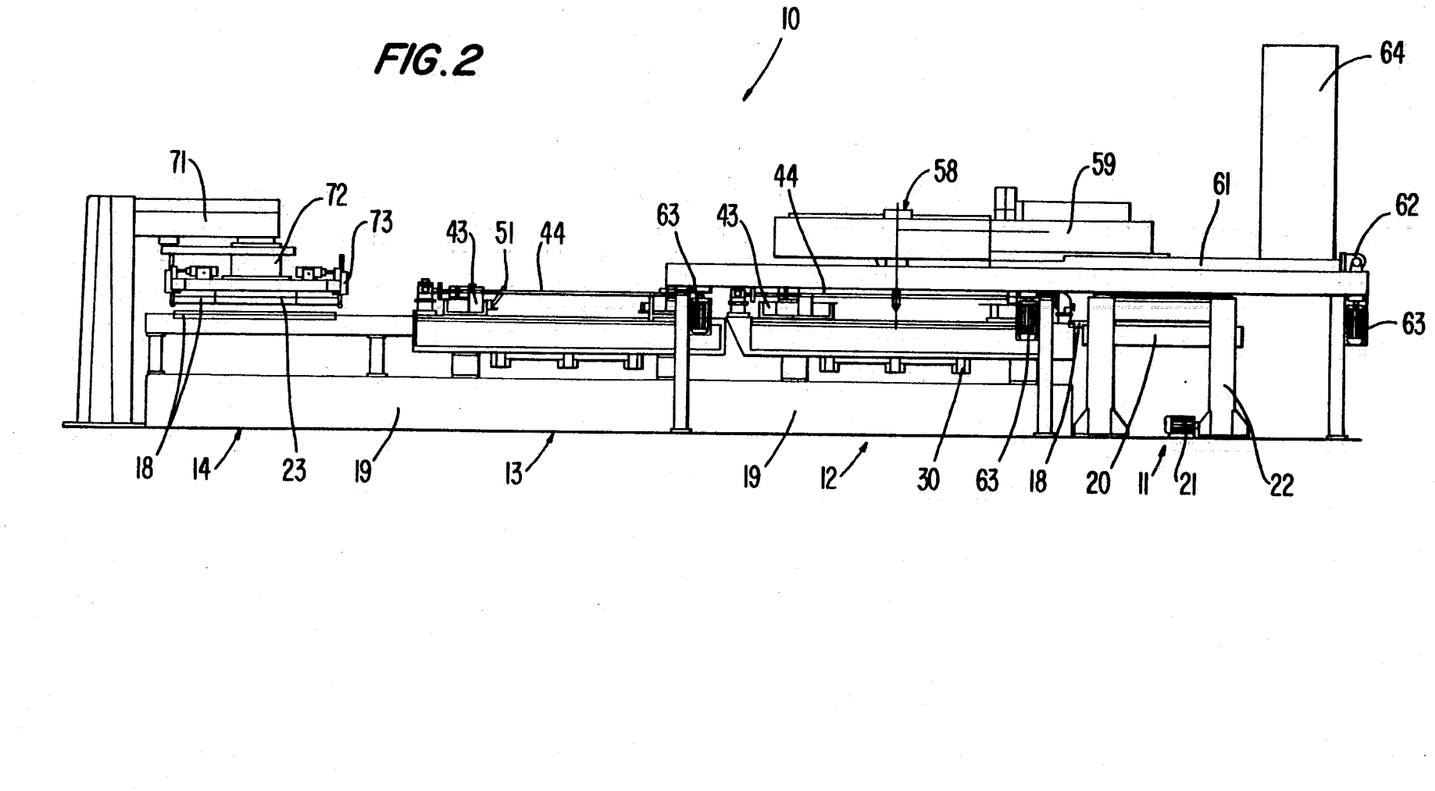
FIG. 2 illustrates in a side view and in enlarged scale, according to arrow A, part of the embodiment of FIG. 1.
Figure 3:
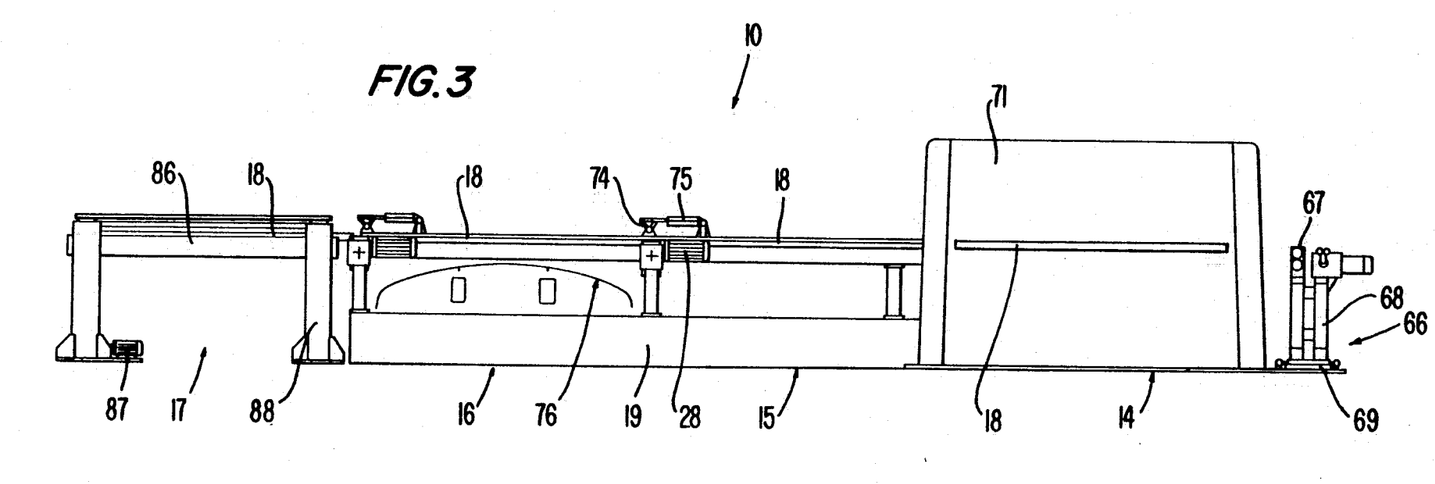
FIG. 3 illustrates in a side view and in enlarged scale, according to arrow B, another part of the embodiment of FIG. 1.

With reference to FIG. 1 and to FIGS. 2 and 3, which are side views in vertical section according to arrows A and B of FIG. 1, respectively, the cutting apparatus 10 is made up in this embodiment of a plurality of stations arranged on two working groups which extend at right-angles one to the other.

In the first working group are a pallet lifting station 11, a cutting station for stretched PVB 12, a cutting station for flat PVB 13 and a pallet rotation station 14.

In the second working group, which, as stated above, is arranged at right-angles to the first, is a pallet transfer station 15, a station 16 for assembly of the sheets of glass with the PVB and a pallet lowering station 17.

As a support for the cutting of the PVB and for its transfer into the glass assembly area, a pallet 18 is used, of the type illustrated in FIGS. 6 and described in detail in the following description.

The pallet 18 passes successively from the lifting station to the lowering station 17, held in a horizontal position and travelling along said route at a high vertical level, as can be seen more clearly in FIGS. 2 and 3.

In the lowering station 17 the pallet 18 is returned to the cycle, being brought back to a lower level of travel (not shown in the drawings), corresponding to a route returning it towards the lifting station 11.

Said return route is situated inside the basic structure 19 and is parallel to the outward route.

Advantageosly, on the outward and return routes between stations 11 and 17, a plurality of pallets 18 is to be found.

When the "re-cycled" pallet 18 arrives at the lifting station 11, it is picked up by the lifting means 20 and, by means of its motor member 21, is lifted onto the posts 22 of the station 11 until reaching the raised position for travelling through the cutting apparatus 10 (see FIG. 2).

From said raised position in station 11 the pallet 18 is tranferred into the successive stretched PVB cutting station 12, for example by means of a blade pusher 23, moving on guides 24 through the action of a jack 25, similar to that which can be seen in the pallet lowering station 17 in FIG. 1.

In the station 12 the pallet 18 is positioned on guide rollers 26, integral with the bearing structure 27 of the cutting station 12, and activated by their own motor means 28.

In the station 12 is also present a bell-shaped element 29, which is substantially a box, supported at 30, vertically mobile with the object of bringing the pallet 18 into cooperation with the PVB sheet to be cut, while at the same time performing a centering of the pallet 18 itself.

With this object, the bell-shaped element 29 has on its top suitable reference means, for example balls, which are brought into abutment with coordinated reference means situated on the pallet 18 itself, as will be more clearlyy described below.

The bell-shaped element 29 is also advantageously under low pressure with the aim of sucking up the fumes given off during the cutting operations.

The flat PVB cutting station 12 cooperates with a feeding group 31 for flat PVB, whose function, along with the continuous feeding of the film of PVB, is also that of regulating in real time the position of the film on a horizontal plane when entering cutting station 12.

With this object the feeding group 31 has a platform 32 which moves on slide guides 33 by means of a motor means 34, said motor means 34 being servoed to means for the continuous control of the unrolling of the roll of PVB, for intance photocells.

The PVB is wound onto a conical roll 35 placed on a vertical axis, said roll 35 cooperating with a tumbling device 36 powered by 37.

The tumbling device 36 allows the operations of loading and unloading the roll 35, as well as any angular inclination of the axix of the same with the object of vertically orientating the generatrix of the cone at its unrolling point.

With the same object, the conical roll 35 cooperates with tipping means 38, likewise powered by 39, so as to allow a double inclination of the axis of the roll 35 in the orthogonal planes X-Z and Y-Z, Z being the vertical axis of the conical roll 35.

The film of PVB unwound from the roll 35 and supported by feeding guide rollers 40, is taken up in the cutting station 12 by pinching means carried by a pair of chain groups, indicated with a dotted line in 41 in FIG. 1.

The chain groups 41, in a closed ring, are suitably powered at 42 and are carried by a pair of carriages 43 which move transversally to the direction of feeding of the film of PVB into the cutting station 12.

Said carriages 43 can run in synchronism one towards the other along the bearing structure 27 due to screw means 44 activated by a motor means 45.

The relative movement of the carriages 43 is necessary in order to adapt the apparatus to the various heights of the PVB film being worked.

At the cutting station 12 are provided means for the adjustment of the curvature of the stretched PVB.

Figures 4A, 4B:
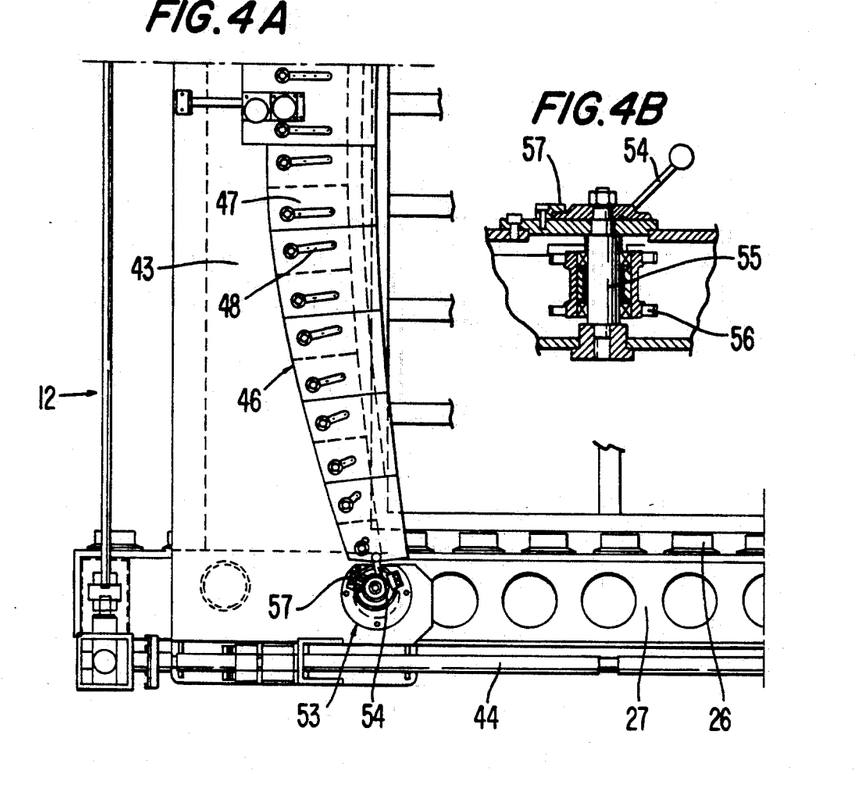
FIG. 4 is an enlarged plan view of a part of the first cutting station of the embodiment of FIG. 1.

With this object, on the carriages 43, curvature adjustment groups 46 are provided, as can be more clearly seen in FIG. 4.

Said groups 46 are formed by a plurality of adjustment blocks 47 having windows 48, by means of which their position on the horizontal plane can be modified to form the desired curved cutting profile.

Said adjustment blocks 47 form the guide means for the cain groups 41 in their action of feeding the film of PVB into the cutting station 12.

Figure 5:
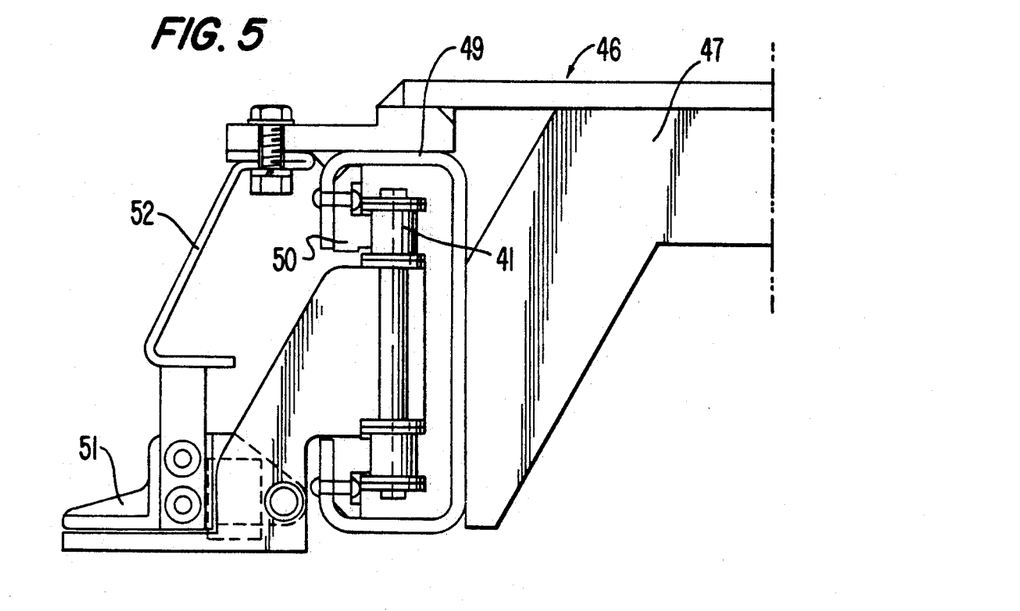
FIG. 5 illustrates details of the station according to FIG. 4.

In FIG. 5 can be more clearly seen the constructive details of the adjustment group 46, in which each block 47 has at the end thereof a C-shaped bar 49 to which are fixed the guide blocks 50 on which the chain 41 runs.

To said chain 41 are fixed the pincers 51 driving the film of PVB, said pincers being kept during driving in a closed position, as illustrated in the example of FIG. 5, in abutment against a plate 52 integral with the block 47.

When the plate 52 and pincer 51 are out of abutment, the latter opens, for example through an elastic means, abbandoning its hold on the film of PVB and therefore also ceasing to pull it.

The guide plugs 50 are fixed to the C-shaped bar in a position opposite, with regard to chain 41, to that illustrated in FIG. 5, when it is required to make on the second carriage 43 a curvature complementary to that on the first carriage 43, as can be seen in FIG. 1.

In the case of feeding of flat PVB which can take place at the successive station 13, on the C-shaped bar 49 the guide plugs 50 are fixed on both sides with respect to the chain 41.

In FIG. 4 is shown, also in an enlarged vertical section, an eccentric group 53 for aligning the end of chain 41 with the first adjustment block 47 according to the various possible cutting curves.

This alignment is made by moving a lever 54 which causes the rotation of an eccentric pin 55 which is integral with the pinion 56 of the chain 41.

On reaching the desired position, it is fixed by means of suitable blocking wedges 57.

Cutting of the PVB takes place by means of a laser beam cutting unit, preferably of the polar type or the like accomplishing the cutting by variation of its polar coordinates $\rho$ and x.

With this object the laser beam generator is mounted on a rotating platform 59, on the arm 60 of which can be moved in a linear direction the optical group for 90° reflection and focusing of the beam 58 in order to obtain the desired coordinate x.

The cutting apparatus is mounted on a carriage 61 which is movable above the structure of the stations 11 and 12 so as to perform alternately cutting of the stretched PVB at 12 or the cutting of the flat PVB at 13.

The moving carriage 61, activated by the motor means 62, positions itself in the desired cutting area by means of suitable stops 63.

Said carriage 61 also carries the console for the laser generator 64, as well as a service console 65 for control and adjustment of the operating functions connected to the performance of cutting.

By means of said console 65, for example, the working parameters relating to the optic group 58, to the axes of the four chains 41 in the working stations 12 and 13, and to the power of the laser beam are controlled and coordinated.

To each cutting station 12 or 13 can be associated a bin for collection of the waste produced during cutting.

The station for cutting of flat PVB 13 has a conformation substantially similar to the station for cutting of stretched PVB 12, with the adjustments required.

It cooperates with a group for feeding the flat PVB 66, having the function of feeding the film of PVB and of regulating in real time the transversal position of the film on entering the cutting station 13, so as to keep it aligned with the chain groups 41 of the station 13.

The transversal regulation can take place by means of an axis governed by optical means which read for istance the position of one of the two edges of the film.

For said transversal regulation the group 66 is provided with two pairs of motor feeder rollers 67 mounted on a support structure 68 moving on a platform 69 by means of a suitable motor meand, the latter being for example governed by photocell means.

The PVB forms a loop between the pairs of rollers 67 so as to form a slack in the material to avoid stretching.

The flat PVB feeding group 66 cooperates upstream with a slacking apparatus 70 for slacking off the material.

In the pallet rotation station 14 the pallet 18 can be rotated, according to requirements, by 180° before being sent on to the following stations by means of a pusher 23, as previously illustrated for station 17.

Station 14 is formed by a structure for the housing and running of the pallet 18, similar to the previous ones, and cooperates with a shelf structure 71, bearing the activating means of an orientation chuck 72.

Said chuck 72 is provided at its end with moving pincers 73 for picking up the pallet 18, in order to lift it and rotate it.

The pallet transfer station 15 is built in a similar manner to the previous one, and is a waiting and transit station.

In FIGS. 1 and 3 are illustrated in said station 15 and in the following station 16 a means for stopping the pallet 18 in position, for example by means of a lever 74 activated by a jack 75.

In the assembly station 16 the cut to shape PVB is picked up from its respective pallet 18 to be inserted between the sheets of glass 76 in the respective glass assembly station 77.

In said station 16 the pallet 18 is temporarily lifted into a known and predetermined position for picking up of the PVB, centering of the pallet 18 itself being performed during said lifting.

Said operation is performed in effect by means of four centering groups 78, substantially placed in correspondence with the corners of the pallet 18 and formed for example by piston groups with a contact sphere at their ends.

Figures 6A, 6B:
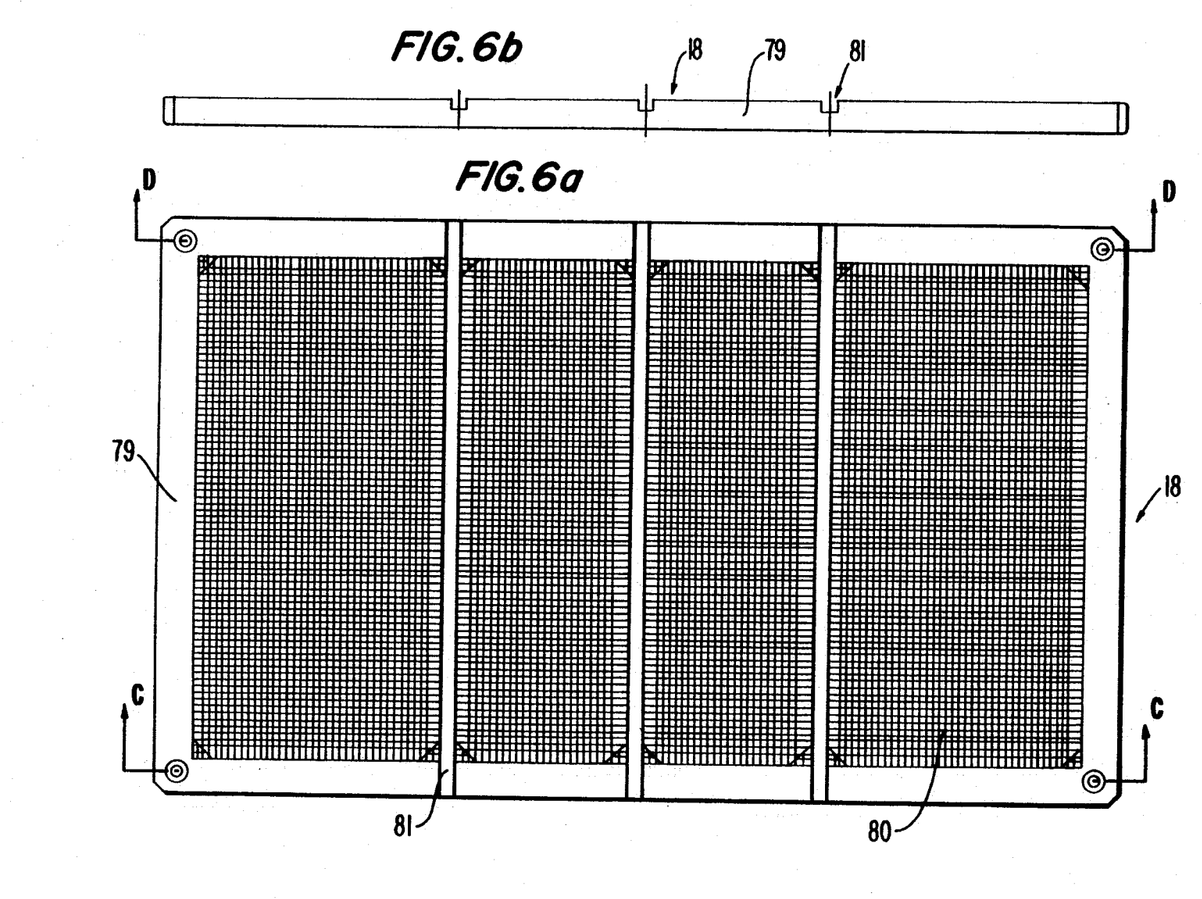
Figure 6C:
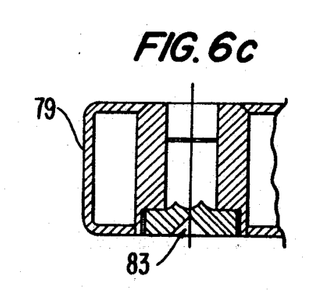
Figure 6D:
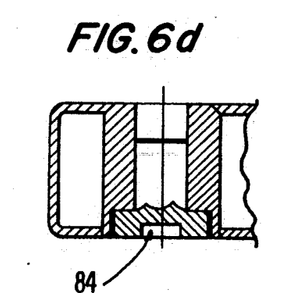
Figure 6E:
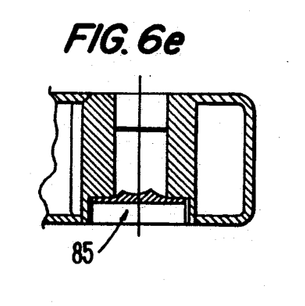

The pallet 18 is illustrated in FIGS. 6, in which 6a illustrated a plan view, 6b a side view and FIGS. 6c, 6d and 6e the enlarged partial sections according to arrows C, D and E, respectively.

Pallet 18 is formed by a frame 79, preferably metal, containing grill-shaped bearing planes 80 for the sheet of PVB.

It has transversal grooves 81 suitable to house outer fork carrier means, indicated with a dotted line in 82 in FIG. 1, for removal of the shaped PVB from the pallet 18.

For lifting and complete centering of the pallet 18 by means of the sphere means mentioned above, the frame 79 has in this case at its corners a cone reference 83 (FIG. 6c), two flat references 84 (FIG. 6d) and a V-shaped reference 85 (FIG. 6e).

The empty pallet 18 passes successively to the descent station 17, in which, by means of a suitable descender 86 activated by motor means 87, it is brought down to the lower transit level descending along the uprights 88.

In said lowered position it is pushed, as stated, by the pusher 23 onto the means for returning it to station 11, said means being a roller, or belt, or chain conveyor or any other means suited to this purpose.

While a description has been given of a preferred embodiment of the invention, it is evident that for those skilled in the art a number of variations are possible without departing from the scope of the invention.

We claim:

1. A method of assembling the materials of laminated glass, said method comprising:
   positioning a pallet at a location constituting the beginning of a closed circuitous route;
   transferring the pallet along said route from said location into a cutting area;
   centering the pallet spatially in said cutting area while substantially contemporaneously feeding plastic material onto the pallet in the cutting area;

cutting the plastic material in the cutting area with a moving cutting system while keeping the material fixed in position;

transferring the pallet with the cut plastic material thereon along said route to a transition are upstream, with respect to said route, of an apparatus that assembles the materials of laminated glass;

transferring the pallet from said transition area along said route into an assembly zone where the apparatus that assembles the materials of laminated glass is located, and spatially centering the pallet in said assembly zone;

moving the cut plastic material from off the pallet spatially centered in the assembly zone and into the apparatus that assembles the materials of laminated glass;

inserting the cut plastic material between two sheets of glass in said apparatus;

transferring the pallet, once the cut plastic material has been taken therefrom, along said route to a recirculation area from which pallets are returned to the beginning of said route; and returning the pallet along said route from the recirculation area to said location constituting the beginning of the closed circuitous route.

2. A method of assembling the materials of laminated glass as claimed in claim 1, wherein said transferring of the pallet occurs along a first line of transit lying in a horizontal plane, and said returning of the pallet occurs along a second line of transit parallel to said first line of transit and lying in a horizontal plane at a level different from that at which the transferring of the pallet occurs.

3. A method of assembling the materials of laminated glass as claimed in claim 1, wherein the cutting of the plastic material is carried out along polar coordinates.

4. A method of assembling the materials of laminated glass as claimed in claim 1, wherein the contemporaneous feeding of plastic material onto the pallet in the cutting area comprises selectively providing flat and stretched films of plastic material in the cutting area.

5. A method of assembling the materials of laminated glass as claimed in claim 4, wherein the cutting of the flat and stretched films of plastic material in the cutting area is carried out in common by a cutter of said cutting system.

6. A method of assembling the materials of laminated glass as claimed in claim 4, and further comprising controlling and automatically adjusting the position of the films of plastic material fed into the cutting area.

7. A method of assembling the materials of laminated glass as claimed in claim 1, and further comprising imparting a curvature to the plastic material fed into the cutting area.

8. A method of assembling the materials of laminated glass as claimed in claim 4, and comprising imparting a curvature to the stretched film of material in the cutting area.

9. A method of assembling the materials of laminated glass as claimed in claim 4, wherein the material constituting the stretched film is fed into the cutting area at a location upstream, with respect to said route, of the location at which the material constituting flat film is fed.

10. A method of assembling the materials of laminated glass as claimed in claim 4, wherein the steps of spatially centering the pallet are carried out by engaging reference members of the pallet with respective centering members at the cutting area and the assembly zone.

11. A method of assembling the materials of laminated glass as claimed in claim 10, wherein the reference members are provided at the bottom of the pallet and the centering members are lifted into engagement therewith.

12. A method of assembling the materials of laminated glass as claimed in claim 1, wherein the assembly zone constitutes part of a production line of the apparatus that assembles the materials of laminated glass such that the transferring of the pallet from the transition area into the assembly zone moves the pallet into said production line.

13. A method of assembling the materials of laminated glass as claimed in claim 1, wherein the cutting of the plastic material is carried out using a laser.

14. A method of assembling the materials of laminated glass as claimed in claim 1, wherein the transferring of the pallet from the cutting area to the transition area includes rotating the pallet by 180°.

15. Apparatus for cutting plastic material and feeding the cut plastic material to a production line, said apparatus comprising:

an upper line and a lower line defining a circuitous route, and pallets circulatable along said route, said upper line including a stretched PVB cutting station at which stretched PVB is cut, a flat PVB cutting station at which flat PVB is cut, a pallet rotation station which rotates selected ones of said pallets traveling along said route, a pallet transfer station which receives a pallet traveling from said pallet rotation station, and an assembly station at which PVB is removed from a pallet located thereat, feeding machinery which feeds material constituting stretched PVB to said stretched PVB cutting station, feeding machinery which feeds material constituting flat PVB to said flat PVB cutting station, a laser beam cutting system operable to cut PVB at said stretched PVB and said flat PVB cutting stations, a pallet descent station disposed between said upper and said lower lines at a location downstream of said assembly station with respect to said route, said pallet descent station lowering pallets from said upper line to said lower line, and a pallet raising station disposed between said upper and said lower lines at a location upstream of said PVB cutting stations with respect to said route, said pallet raising station raising pallets from said lower line to said upper line.

16. Apparatus as claimed in claim 15, wherein said laser beam cutting system includes a movable carriage supported above said upper line, a rotary platform rotatably supported by said carriage, an arm extending from said rotary platform, and an optical system supported by said arm so as to be movable therealong.

17. Apparatus as claimed in claim 15, wherein each of said cutting stations includes a pincer which pinces plastic material fed thereto by the respective feeding machinery associated with the cutting station, and a pulling device to which the pincer is connected, said pulling device capable of pulling said pincer in a direction which will draw plastic material pinced thereby into the cutting station.

18. Apparatus as claimed in claim 17, wherein each of said cutting stations further includes a pair of movable carriages, and a pair of the pulling devices each having a said pincer connected thereto and mounted to a respective one of the carriages.

19. Apparatus as claimed in claim 15, wherein each of said cutting stations includes a bell-shaped element.

20. Apparatus as claimed in claim 18, wherein each of said cutting stations also includes a vacuum system communicating with the interior of said bell-shaped element, and the interior of said bell-shaped element is open to the exterior thereof so that a vacuum maintained in the bell-shaped element will induce fumes created during the cutting of the plastic material to the bell-shaped element.

21. Apparatus as claimed in claim 19, wherein each of said cutting stations also includes an elevating mechanism which elevates the bell-shaped element into and out of engagement with a pallet located at the cutting station.

22. Apparatus as claimed in claim 20, wherein each of said cutting stations also includes an elevating mechanism which elevates the bell-shaped element into and out of engagement with a pallet located at the cutting station.

23. Apparatus as claimed in claim 21, wherein said bell-shaped element has engaging members at an upper surface thereof, and each of said pallets includes reference members in the bottom thereof configured to receive the respective engaging members of each of said cutting stations.

24. Apparatus as claimed in claim 23, wherein said bell-shaped element has engaging members at an upper surface thereof, and each of said pallets includes reference members in the bottom thereof configured to receive the respective engaging members of each of said cutting stations.

25. Apparatus as claimed in claim 15, wherein said stretched PVB cutting station includes means for imparting various curved configurations to the material fed to the stretched PVB cutting station.

26. Apparatus as claimed in claim 15, wherein said feeding machinery which feeds material to said stretched PVB cutting station includes a frame, a platform movably mounted to said frame, a roll supported by said platform with the axis of rotation of said roll extending generally vertically, and a loading and unloading mechanism connected to said roll and operative to facilitate the loading and unloading of PVB material onto and from the roll.

27. Apparatus as claimed in claim 25, wherein said loading and unloading mechanism is operable to adjust the orientation of the rotational axis of said roll.

28. Apparatus as claimed in claim 25, wherein said feeding machinery which feeds material to said stretched PVB cutting station comprises means for positioning said roll such that the position at which the stretched PVB material is fed to said PVB cutting station can be adjusted.

29. Apparatus as claimed in claim 15, wherein said feeding machinery which feeds material to said flat PVB cutting station comprises a platform, a support structure mounted to said platform so as to be movable therealong, and rollers rotatably supported by said support structure.

30. Apparatus as claimed in claim 15, wherein said pallet rotating station comprises a shelf-like structure, an orientation chuck supported by said shelf-like structure and having pincers, said chuck and pincers operable to pick up a pallet at said rotating station and rotate the pallet.

31. Apparatus as claimed in claim 15, wherein said assembly station includes a group of centering members cooperable with the pallets to center each of the pallets at the assembly station.

32. Apparatus as claimed in claim 15, wherein said pallet descent station includes uprights extending between said upper and said lower lines, a descender supported by said uprights so as to be vertically movable therealong, and a motor operatively connected to said descender so as to drive said descender vertically along said uprights.

33. Apparatus as claimed in claim 15, wherein said upper line includes motorized rollers positioned to drive the pallets along the upper line.

34. Apparatus as claimed in claim 15, wherein said pallet raising station, said pallet rotation station and said pallet descent station each includes means for expelling a pallet in a direction downstream from the respective station with respect to said route.

35. Apparatus as claimed in claim 15, wherein said upper line includes two legs intersecting at a right angle, and said stations are located along said legs.

36. Apparatus as claimed in claim 15, wherein said assembly station is an integral part of an assembly line of an apparatus that assembles materials of laminated glass.

37. Apparatus as claimed in claim 15, and further comprising a slacking apparatus disposed upstream of said feeding machinery, which feeds material to the flat PVB cutting station, with respect to the direction in which the material is fed, said slacking apparatus creating slack in the material being fed to the flat PVB cutting station.

38. Apparatus as claimed in claim 15, and further comprising a bin associated with each of said cutting stations so as to collect waste therefrom.

* * * * *